(12) United States Patent  
Rune et al.

(10) Patent No.: US 9,961,695 B2  
(45) Date of Patent: May 1, 2018

(54) SCHEDULING IN MOBILE COMMUNICATIONS SYSTEMS

(71) Applicant: Telefonaktiebolaget L M Ericsson (publ), Stockholm (SE)

(72) Inventors: Johan Rune, Lidingö (SE); Ralf Bergqvist, Bromma (SE); Erik Friman, Stockholm (SE); Lars Westberg, Enköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 104 days.

(21) Appl. No.: 14/438,279

(22) PCT Filed: Nov. 5, 2012

(86) PCT No.: PCT/SE2012/051200  
§ 371 (c)(1),  
(2) Date: Apr. 24, 2015

(87) PCT Pub. No.: WO2014/070059  
PCT Pub. Date: May 8, 2014

(65) Prior Publication Data  
US 2015/0319770 A1 Nov. 5, 2015

(51) Int. Cl.  
*H04W 72/12* (2009.01)  
*H04B 7/216* (2006.01)  
(Continued)

(52) U.S. Cl.  
CPC ........ *H04W 72/1205* (2013.01); *H04B 7/216* (2013.01); *H04L 47/24* (2013.01);  
(Continued)

(58) Field of Classification Search  
CPC ......... H04W 28/0215; H04W 28/0221; H04W 28/0247; H04W 28/0268; H04W 28/0278;  
(Continued)

(56) References Cited

U.S. PATENT DOCUMENTS

2007/0116007 A1 5/2007 Xiao et al.  
2009/0325512 A1* 12/2009 Granlund ............ H04L 47/2416  
455/91  
(Continued)

FOREIGN PATENT DOCUMENTS

WO WO 2011/124014 A1 10/2011  
WO WO 2011/160232 12/2011

OTHER PUBLICATIONS

International Search Report for International application No. PCT/SE2012/051200, dated Jul. 17, 2013.  
(Continued)

*Primary Examiner* — Pao Sinkantarakorn  
(74) *Attorney, Agent, or Firm* — Sage Patent Group

(57) ABSTRACT

There is provided embodiments relating to scheduling in mobile communications systems, and particularly to scheduling of delay tolerant data in mobile communications systems. A scheduling request relating to conditional data transfer of delay tolerant data is received. The delay tolerant data is scheduled for transmission such that the delay tolerant data is to be transmitted in conjunction with data already scheduled for transmission and utilizing available transmission resources non-utilized for transmission of the data already scheduled for transmission.

23 Claims, 4 Drawing Sheets

(51) Int. Cl.
    *H04W 72/04*     (2009.01)
    *H04L 12/891*    (2013.01)
    *H04L 12/851*    (2013.01)
    *H04W 52/02*     (2009.01)
    *H04W 28/02*     (2009.01)

(52) U.S. Cl.
    CPC .......... *H04L 47/41* (2013.01); *H04W 52/0206* (2013.01); *H04W 72/044* (2013.01); *H04W 72/1273* (2013.01); *H04W 28/02* (2013.01); *H04W 52/0216* (2013.01); *H04W 72/1242* (2013.01); *Y02B 60/50* (2013.01)

(58) Field of Classification Search
    CPC .............. H04W 28/06; H04W 28/065; H04W 52/0206; H04W 52/0216; H04W 72/12–72/1273; H04L 47/24–47/2491; H04L 47/41; H04L 47/56

See application file for complete search history.

(56) References Cited

U.S. PATENT DOCUMENTS

| | | | |
|---|---|---|---|
| 2011/0141959 A1* | 6/2011 | Damnjanovic | H04L 1/1854 370/311 |
| 2011/0299392 A1 | 12/2011 | Lee et al. | |
| 2012/0099430 A1* | 4/2012 | Vos | H04W 28/0215 370/235 |
| 2012/0207120 A1* | 8/2012 | Bark | H04W 72/1252 370/329 |
| 2012/0218889 A1* | 8/2012 | Watfa | H04W 60/04 370/230 |
| 2013/0242735 A1* | 9/2013 | Koc | H04W 28/0268 370/232 |

OTHER PUBLICATIONS

PCT Written Opinion of the International Searching Authority for International application No. PCT/SE2012/051200, dated Jul. 17, 2013.

European Patent Office, Communication Pursuant to Article 94(3) EPC and Annex, Application No. 12 790 693.1-1857, 6 total pages, dated May 4, 2017.

* cited by examiner

SCHEDULING IN MOBILE COMMUNICATIONS SYSTEMS

PRIORITY

This nonprovisional application is a U.S. National Stage Filing under 35 U.S.C. § 371 of International Patent Application Serial No. PCT/SE2012/051200, filed Nov. 5, 2012, and entitled "Scheduling in Mobile Communications Systems."

TECHNICAL FIELD

Embodiments presented herein relate to scheduling in mobile communications systems, and particularly to scheduling of delay tolerant data in mobile communications systems.

BACKGROUND

In mobile communication systems, there is always a challenge to obtain good performance and capacity for a given communications protocol, its parameters and the physical environment in which the mobile communication system is deployed.

Cellular networks are examples of mobile communications systems. Caching concepts are being considered for cellular network for the dual purposes of making more efficient use of network resources and improving the end user service experience (e.g. the "quality of experience", QoE). Sometimes these two goals can be achieved simultaneously, while other times only one of the aspects may be the target under consideration.

For instance, by a network node (such as a base station) delivering requested content from a network cache instead of from a remote server, network resources may be saved, whilst at the same time reducing the download delay experienced by a user of a wireless device (such as a mobile phone) receiving the requested content.

Another example relates to cooperating caches in the mobile communications system, with one cache in the wireless device (the client) and one in the network, and wherein these two caches cooperate to shift traffic, most notably traffic over the radio interface, from high load periods to low load periods. This is achieved by the network node moving content delivery in time, either by delaying it or by proactively delivering it to the wireless devices in advance. In both cases the network resources required during peak load periods may be reduced, thus allowing a more relaxed peak load dimensioning of network resources. Delaying delivery of data may typically require that the concerned data and application using it are delay tolerant. In terms of user experience, delayed data delivery generally cannot increase the QoE, but if handled properly, it may be performed without decreasing the QoE (or with an acceptable moderate decrease of the QoE). On the other hand, in cases when data can be delivered in advance, traffic load peaks may be reduced whilst simultaneously improving the QoE through reduced delay when the pre-delivered data is actually used by an application in the wireless device. This kind of data delivery (i.e. utilizing low load periods) has been coined "lower than best-effort" service/delivery.

Another aspect of cellular networks relates to reduction of the overall energy consumption of a cellular network. This has the dual purpose of saving the environment and reducing network operation costs. One example of a method for energy consumption reduction could involve enabling network nodes to enter a sleep mode (i.e. a mode of operation wherein as much as possible of the equipment of the network node, e.g. transmitter and/or receiver circuitry, baseband circuitry, etc. is switched off). Hence, during periods of low load a network node may enter the sleep mode, or in other ways switch off (parts of) the equipment controlling one of the network node's cells. The network node may repeatedly enter a wake mode to check for present wireless devices in its coverage area or it may rely on one or more other network nodes/cells to take cover the area while being in the sleep mode. Wakeup signals from other network nodes or from wireless devices have also been considered. Since the energy consumption of the network nodes, in particular base stations, generally represent a large fraction of the overall energy consumption of the cellular network (due to their large number and energy consuming transmissions), this strategy could be an efficient means to reduce the energy consumption. To this end, the concept may be leveraged further to push it to the limits of its energy saving potential, e.g. using features such as micro-sleep (e.g., sleep mode periods on a millisecond time scale or even less) and sleep modes of individual components in the equipment.

With regards to the combination of the caching concept and the network node/cell sleep mode strategy, as described above, one finds that these two concepts may not be readily combined. The caching strategy aiming to move traffic from high to low load periods counteracts the strategy to leverage low load periods to conserve energy by means of a sleep mode. Periods when a network node/cell would ideally enter a sleep mode will, from the point of view of a network based cache, or cooperating network and client caches, appear as excellent opportunities to transfer cached content, either proactive or delayed content transfer. This issue may manifest itself on a millisecond or larger (e.g. seconds, minutes) time scale.

Hence, there is still a need for improved scheduling in mobile communications systems.

SUMMARY

An object of embodiments herein is to provide improved scheduling in mobile communications systems.

The inventors of the enclosed embodiments have through a combination of practical experimentation and theoretical derivation discovered that some data is more delay tolerant than other data and that delay tolerant data may be scheduled for conditional data transfer.

A type of data transfer and scheduling strategy is therefore provided. The data transfer and scheduling strategy may be implemented as a new Quality of Service (QoS) class for time-shifted transfer of cached content. The data transfer is based on a concept denoted conditional data transfer. When outputting downlink data from the network cache, the cache functionality may implicitly or explicitly request conditional data transfer.

A particular object is therefore to provide improved scheduling of delay tolerant data in mobile communications systems.

According to a first aspect there is presented a method for scheduling in a mobile communications system. The method is performed in a network node of the mobile communications system. The method comprises acquiring a scheduling request relating to conditional data transfer of delay tolerant data. The method comprises scheduling the delay tolerant data for transmission such that the delay tolerant data is to be transmitted in conjunction with data already scheduled for transmission and utilizing available transmission resources non-utilized for transmission of the data already scheduled for transmission.

Advantageously the transmission of the delay tolerant data by itself thereby does not interfere with sleep periods of the network node, i.e. it does not cause the network node, or parts of its equipment, to wake up from its sleep mode.

Advantageously coexistence of network (and client) cache functionality with the energy saving mechanisms of network nodes is thereby enabled. Delay tolerant cached data may thereby be transferred without interfering with either network node sleep periods or periods of high cell load.

According to a second aspect there is presented a network node for scheduling in a mobile communications system. The network node comprises a processing unit. The processing unit is arranged to acquire a scheduling request relating to conditional data transfer of delay tolerant data. The processing unit is further arranged to schedule the delay tolerant data for transmission such that the delay tolerant data is to be transmitted in conjunction with data already scheduled for transmission and utilizing available transmission resources non-utilized for transmission of the data already scheduled for transmission.

According to a third aspect there is presented a computer program for scheduling in a mobile communications system, the computer program comprising computer program code which, when run on a network node, causes the network node to perform a method according to the first aspect.

According to a fourth aspect there is presented a computer program product comprising a computer program according to the third aspect and a computer readable means on which the computer program is stored. The computer readable means may be non-volatile computer readable means.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The embodiments disclosed herein relate to scheduling in mobile communications systems. In order to obtain scheduling in mobile communications systems there is provided a network node, a method performed in the network node, a computer program comprising code, for example in the form of a computer program product, that when run on a network node, causes the network node to perform the method.

Figure 1:
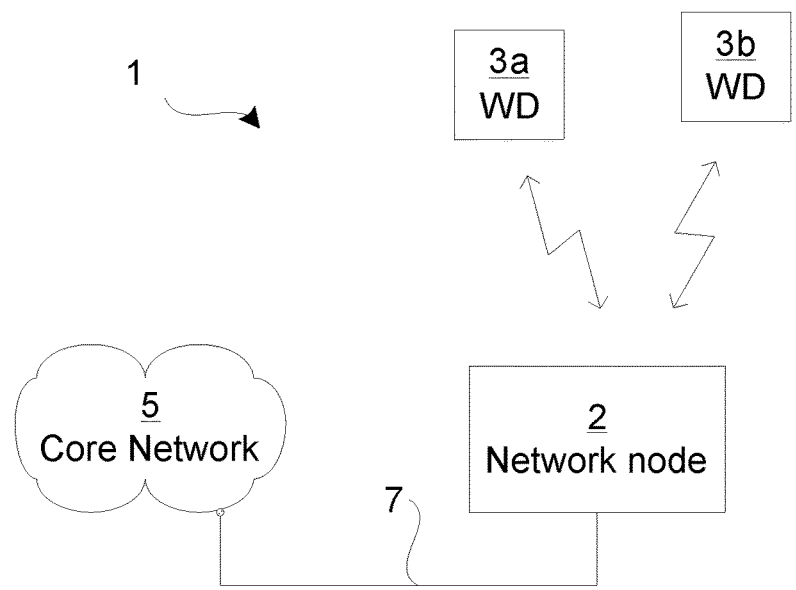
FIG. 1 is a schematic diagram illustrating a mobile communications system where embodiments presented herein may be applied.

FIG. 1 is a schematic diagram illustrating a mobile communication system 1 where embodiments presented herein can be applied. The mobile communications system 1 comprises a network node 2. The mobile communications system 1 further comprises a core network 5 operatively coupled to the network node 2 as schematically illustrated at reference 7. Although not illustrated in FIG. 1, there may in addition be one or more other (types of) network nodes in between the core network 5 and the network node 2. One such example is where the network node is a NodeB and wherein a radio network controller (RNC) consequently is located between the NodeB and the network node. Similarly, in some embodiments there may be another (type of) network node between the network node and the wireless device. One such example is where the network node is an RNC and wherein a NodeB consequently is located between the RNC and the wireless device 3a, 3b. In the mobile communications system 1 one or more wireless devices (WD) 3a, 3b are arranged to be operatively connected to the network node 2. Each WD 3a, 3b may be one of a user equipment (UE), a mobile terminal, a user terminal, a user agent, a mobile phone, etc. As is understood, the mobile 3o communication system 1 may generally comprise a plurality of network nodes 2 and a plurality of WDs 3a, 3b.

The mobile communication system 1 may generally comply with any one or a combination of W-CDMA (Wideband Code Division Multiple Access), LTE (Long Term Evolution), EDGE (Enhanced Data Rates for GSM Evolution, GPRS (General Packet Radio Service)), CDMA2000 (Code Division Multiple Access 2000), etc., as long as the principles described hereinafter are applicable. According to embodiments the mobile communication system 1 is compliant with the Evolved Universal Terrestrial Radio Access Network (E-UTRAN). Typically the E-UTRAN consists only of network nodes 2 in the form of eNodeBs (E-UTRAN NodeB, also known as Evolved NodeB) on the network side. The network node 2 may according to embodiments alternatively be a traditional NodeB which typically has minimum functionality, and is controlled by an RNC (Radio Network Controller). NodeB is a term used in UMTS (Universal Mobile Telecommunications System) equivalent to the BTS (base transceiver station) description used in the Global System for Mobile Communications (GSM). Furthermore, the network node 2 may according to embodiments alternatively be an RNC. The eNodeB performs tasks similar to those performed together by the NodeBs and the RNC in UTRAN. The aim of the E-UTRAN simplification is generally to reduce the latency of radio interface operations. eNodeBs are typically connected to each other via the so-called X2 interface, and they connect to the packet switched (PS) core network 5 via the so-called S1 interface.

The embodiments disclosed herein relate to improved scheduling in the mobile communications system 1. The embodiments disclosed herein are based on the understanding that data that is subject to conditional data transfer is treated as delay tolerant by the scheduler and will be handled in a manner so as to neither interfere with sleep periods of the network node 2 or its transmission equipment nor to use transmission resources that would otherwise have been used for transmission of other data. In general terms, according to embodiments the scheduling strategy is based on transferring such data only in time slots, e.g. LTE subframes, during which other data is anyway transferred and during which the network node 2 and its transmission equipment would anyway be active, provided that there are available transmission resources in the concerned time slots, which are not needed for higher priority transmissions (i.e. the "other data").

Delay tolerant uplink data may be handled according to similar principles, wherein the scheduler determines whether pending uplink data is subject to conditional data transfer based on wireless device category, subscription data or information about the uplink transmission buffers in the wireless devices (which is signalled from the wireless devices).

In order to obtain improved scheduling in the mobile communications system 1 there is provided a network node 2, a method performed in the network node 2, and a computer program 20 comprising code, for example in the form of a computer program product 18, that when run on the network node 2, causes the network node 2 to perform the method.

Figure 2:
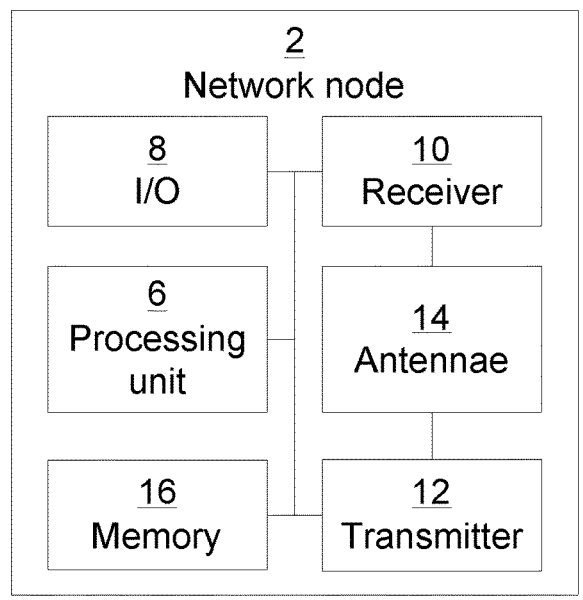
FIG. 2 is a schematic diagram showing functional modules of a network node.

FIG. 2 schematically illustrates, in terms of a number of functional modules, the components of a network node 2. A processing unit 6 is provided using any combination of one or more of a suitable central processing unit (CPU), multi-processor, microcontroller, digital signal processor (DSP), application specific integrated circuit (ASIC), field programmable gate arrays (FPGA) etc., capable of executing software instructions stored in a computer program product 18 (as in FIG. 3), e.g. in the form of a memory 16. Thus the processing unit 6 is thereby arranged to execute methods as herein disclosed. The memory 16 may also comprise persistent storage, which, for example, can be any single one or combination of magnetic memory, optical memory, solid state memory or even remotely mounted memory. The network node 2 may further comprise an input/output (I/O) interface 8 for receiving and providing information to the core network 5. The network node 2 also comprises one or more transmitters 12 and receivers 10, comprising analogue and digital components and a suitable number of antennae 14 for radio communications with one or more wireless device 3. The processing unit 6 controls the general operation of the network node, e.g. by sending control signals to the I/O interface 8, the transmitter 12 and/or receiver 10 and receiving reports from the I/O interface 8, the transmitter 12 and/or receiver 10 of its operation. Other components, as well as the related functionality, of the network node 2 are omitted in order not to obscure the concepts presented herein.

Figure 3:
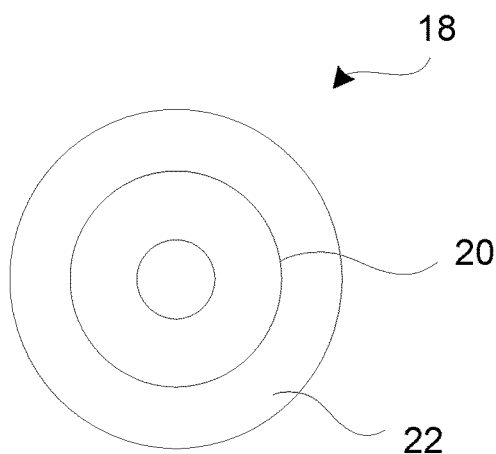
FIG. 3 shows one example of a computer program product comprising computer readable means.
Figure 4:
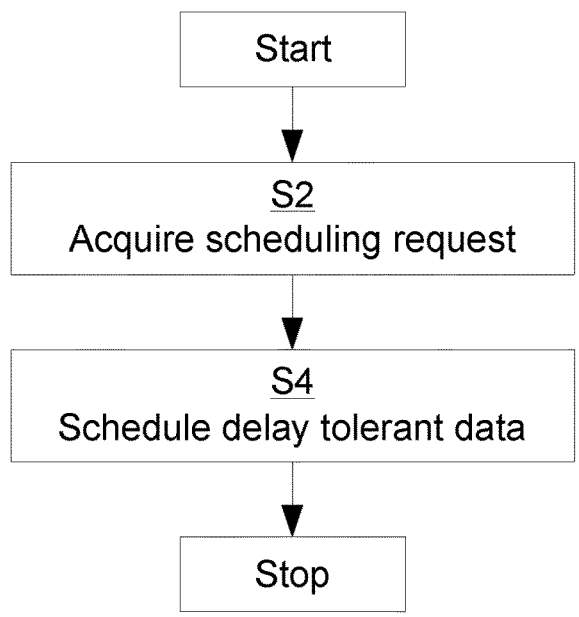
FIGS. 4-6 are flowcharts of methods according to embodiments.
Figure 5:
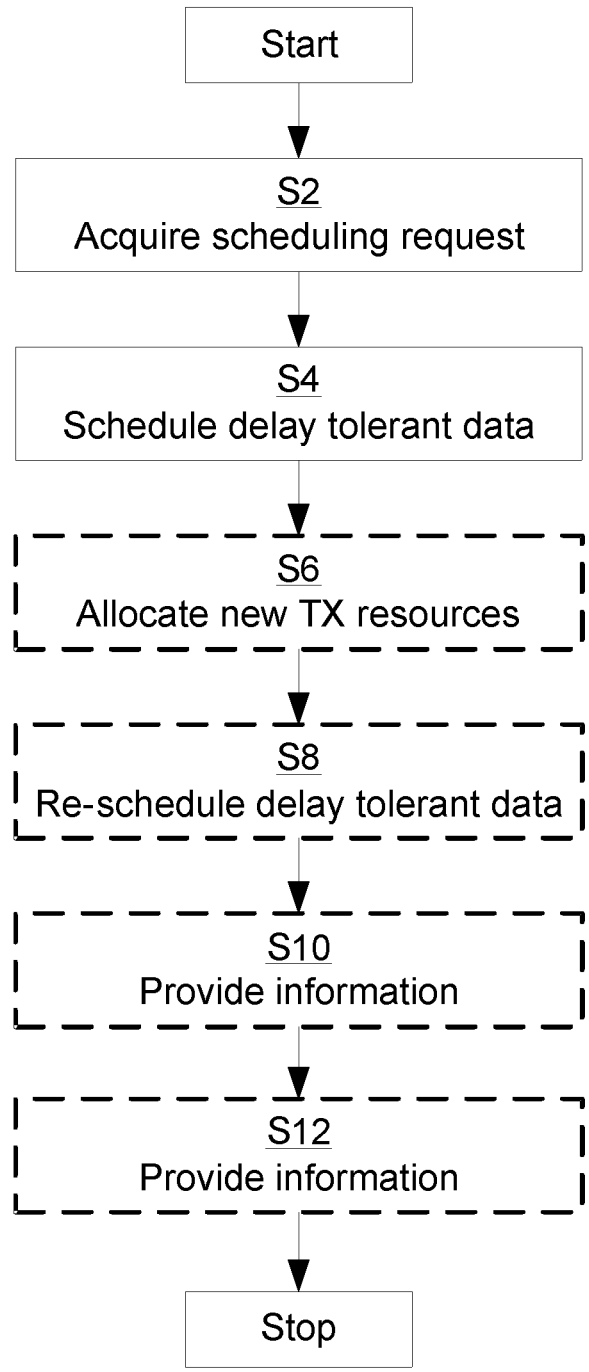

FIGS. 4 and 5 are flow charts illustrating embodiments of methods for scheduling in mobile communications systems. The methods are performed in the network node 2. The methods are advantageously provided as computer programs. FIG. 3 shows one example of a computer program product 18 comprising computer readable means 22. On this computer readable means 22, a computer program 20 can be stored, which computer program 20 can cause the processing unit 6 and thereto operatively coupled entities and devices, such as the memory 16, the I/O interface 8, the transmitter 12, the receiver 8 and/or the antennae 18 to execute methods according to embodiments described herein. In the example of FIG. 3, the computer program product 18 is illustrated as an optical disc, such as a CD (compact disc) or a DVD (digital versatile disc) or a Blu-Ray disc. The computer program product could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 18.

A method for scheduling in a mobile communications system 1 comprises in a step S2 acquiring a scheduling request relating to conditional data transfer of delay tolerant data. The scheduling request is acquired by the network node 2. According to embodiments the delay tolerant data represents downlink data cached in the network node 2. In more detail, when a cache functionality of the network node 2, located within the network node 2 or in another node in the network, assesses that conditions are reasonably good for transfer of the cached downlink delay tolerant data, e.g. that the cell load is rather low or the conditions motivate content transfer in some other way, the cache functionality will forward the delay tolerant data, or start forwarding the delay tolerant data to the network node 2, or, in case the cache is integrated in the network node 2 to a network node 2 entity that is responsible for downlink data transfer. The cache functionality may implicitly or explicitly request a conditional data transfer for the delay tolerant data.

In a step S4 the delay tolerant data is scheduled for transmission. The scheduling is performed by the network node 2. Data that is subject to conditional data transfer (i.e. the delay tolerant data) is treated as delay tolerant by the scheduler and may be handled in a manner so as to neither interfere with sleep periods of the network node 2 or its transmission equipment nor to use transmission resources that would otherwise have been used for transmission of other data. The delay tolerant data is therefore scheduled for transmission such that the delay tolerant data is to be transmitted in conjunction with data already scheduled for transmission. The delay tolerant data is scheduled for transmission such that the transmission utilizes available transmission resources but which are non-utilized for transmission of the data already scheduled for transmission.

For example, the scheduling may involve transferring such data only in time slots, e.g. LTE subframes, during which other data is anyway transferred and during which the network node 2 and its transmission equipment would anyway be active, provided that there are available transmission resources in the concerned time slots, which are not needed for higher priority transmissions (i.e. the "other data"). For example, in LTE this may be a situation where one or more other transmission(s) is/are scheduled for the same subframe, but which one or more other transmission(s) do(es) not occupy the entire available bandwidth. The remaining bandwidth may then be used for transmission of cache data subject to conditional data transfer. That is, according to an embodiment the mobile communications system 1 is compliant with 3rd Generation Partnership Project Long Term Evolution, LTE. The available transmission resources may then be associated with LTE resource blocks. The delay tolerant data may be scheduled for transmission utilizing available but otherwise unused LTE resource blocks.

As another example, in WCDMA this may be a situation where one or more other transmission(s) is/are scheduled simultaneously, but there are unused parts of the code tree (and available transmission power) that may be used for conditional data transfer and the created interference is not too high (wherein the latter for downlink transmissions typically should be more of an inter-cell than an intra-cell problem since the WCDMA downlink transmissions are mutually orthogonal). That is, according to an embodiment the mobile communications system 1 is compliant with wideband code division multiple access, WCDMA. The available transmission resources may then be associated with a code tree, and the delay tolerant data may be scheduled for transmission utilizing otherwise unused parts of the code tree. The delay tolerant data may be scheduled for transmission utilizing the unused parts of the code tree when the available transmission power is below an available transmission power limit. Additionally or alternatively the delay tolerant data may be scheduled for transmission utilizing the unused parts of the code tree when interference associated with transmission of the delay tolerant data utilizing the unused parts of the code tree is below a predetermined threshold or when the interference associated with transmission of the delay tolerant data utilizing the unused parts of the code tree combined with the interference from the other transmission(s) or all present interference sources is below a predetermined threshold. The simultaneously scheduled "other transmission(s)" could be directed to one or more other wireless device 3b or to the wireless device 3a that is the receiver of the cached content.

That downlink data to be transferred should be subject to conditional data transfer could be indicated using a QoS class, indicated with a QoS Class Identifier (QCI) value. Thus, according to embodiments the delay tolerant data is associated with an indicator indicating that the delay tolerant data is delay tolerant. The indicator may be provided as a quality of service class indicator, QCI, value. One of the presently unused values 10-255 may be used for this purpose. Such a QCI value may be used proprietarily or even be standardized. Thus, according to embodiments the QCI value is between 10 and 255.

The indication of conditional data transfer could also be provided by in-band signalling or, in case the cache is integrated with the network node 2 performing the scheduling, i.e. the LTE eNB or the 3G RNC (or 3G Node B), as a node internal request signal.

According to embodiments the delay tolerant data is associated with at least one delay time limit. Thus, according to embodiments there are different types of delay time limits. A latest delivery time or maximum delay may thereby be associated with the data to be delivered using conditional data transfer. The delay tolerant data may be scheduled for transmission utilizing transmission resources that are available simultaneously with other data to be transmitted (as previously described) up until the delay time limit has been reached.

According to embodiments, when this time or delay limit is reached, the data is to be sent even if there is no other simultaneous transmission to leverage. Alternatively, upon reaching the delay time limit a scheduling priority for transmission of the delay tolerant data may be increased, step S6. Yet alternatively, upon reaching the delay time limit new transmission resources may be allocated, step S8, and the delay tolerant data may be re-scheduled, step S10, for transmission utilizing the new transmission resources. For example, the delay tolerant data may be re-scheduled for transmission on next available transmission resources (irrespective of whether there are other simultaneous transmissions).

The delay time limit associated with scheduling priority may be regarded as a soft time limit indicating when the scheduler should increase the scheduling priority of the data subject to conditional data transfer. If used in combination with a maximum delay time limit, this soft time limit should expire earlier than the maximum delay time limit. There may be multiple soft time limits for stepwise increments of the scheduling priority. However, such functionality does not necessarily have to involve a soft time limit transferred from the cache functionality, but may also be implemented internally in the scheduler. The scheduler may not even use explicit soft time limits, but may instead employ an algorithm whereby the scheduling priority of the concerned data is more or less continuously increased with time.

Thus, according to embodiments the at least one delay time limit comprises a priority delay time limit and the scheduling priority in step S6 is increased upon reaching the priority delay time limit of the at least one delay time limit. Further, according to embodiments the at least one delay time limit comprises a scheduling delay time limit and the new transmission resources in step S8 are allocated upon reaching the scheduling delay time limit of the at least one delay time limit. Thus, the at least one delay time limit may comprise a priority delay time limit and/or a scheduling delay time limit. If coexisting the priority delay time limit and the scheduling delay time limit may be independent or dependent. For example, according to an embodiment the priority delay time limit is shorter than the scheduling delay time limit. An escalating delay time limit process may thereby be achieved.

In general terms, the uplink is different from the downlink: In the downlink the same network node 2 (e.g. the LTE eNB or the 3G RNC) performs all transmissions and scheduling, whereas in the uplink there are multiple senders (the wireless devices 3a, 3b in a cell) and the network node 2 and hence also the scheduler is located on the data receiving side. Similar to the case of the downlink, the "other scheduled transmissions" may be transmissions from other wireless devices 3b and/or from the wireless device 3a that is to transmit the data for conditional data transfer.

When the network node 2 responsible for the scheduling (e.g. the eNB in LTE, the RNC in regular WCDMA, or the Node B in HSPA) receives a scheduling request from a first wireless device 3a, wherein the data to be transmitted is subject to conditional data transfer, the scheduler may choose to put this request "on hold", until the network node 2 receives a scheduling request from another wireless device 3b in the same cell. When a scheduling request from another wireless device 3b (or several other wireless devices 3b) is received by the network node 2 this may trigger the scheduler of the network node 2 to schedule the first wireless device 3a for transmission of the data for conditional data transfer simultaneously with the transmission from the one or more other wireless devices 3b, provided that there are available uplink transmission resources (e.g. time-frequency resource blocks in LTE and interference margin in WCDMA/HSPA) left in the cell when the other wireless device(s) 3b has/have been served). It may also be the case that the scheduling network node 2 has already received one or more scheduling request(s) from one or more other wireless devices 3b when receiving the scheduling request from the first wireless device 3a, or receives it/them simultaneously with the scheduling request from the first wireless device 3a. In such a case the scheduler of the network node 2 may schedule the first wireless device 3a simultaneously with the other wireless device(s) 3b without waiting for another scheduling request.

In addition to scheduling requests the scheduler of the network node 2 may utilize information about the contents of the transmission buffers of the wireless devices 3a, 3b in the cell. Such information may be signalled from the wireless devices 3a, 3b to the scheduling node (denoted Buffer Status Report, BSR, in LTE). The scheduler of the network node 2 may utilize such information to schedule wireless device 3a for uplink transmission without a preceding explicit scheduling request (i.e. interpreting a BSR indicating non-empty UE transmission buffer(s) as an implicit scheduling request). This may also allow the scheduler of the network node 2 to plan ahead in time.

The scheduling network node 2 may determine whether pending uplink data is subject to conditional data transfer based on the categories or capabilities of the wireless devices 3a, 3b. That is, according to embodiments the indicator is provided by at least one of a user equipment category, user equipment capabilities, user equipment subscription data, or information relating to uplink transmission buffers in the user equipment. At least a part of uplink data from wireless devices 3a, 3b of a certain category, or wireless devices 3a, 3b with a certain capability, e.g. a 'delay tolerant' category/capability or a new category/capability, may be classified as subject to conditional data transfer. One alternative is to base the classification on subscription data, wherein this particular part of the subscription data is conveyed from the Home Subscriber Server/Home Location Register (HSS/HLR) via a core network node to the scheduling network node 2.

In case of Evolved Packet System/LTE the forwarding core network node would be the MME, whereas in UMTS/WCDMA/HSPA the forwarding core network node would be the Serving General Packet Radio Service Support Node (SGSN). In case of HSPA the RNC would have to forward the information further to the Node B. For example, in EPS/LTE the Subscriber Profile Identifier (SPID), which is transferred to the eNB in the "Subscriber Profile ID for Radio Access Technology/Frequency Priority" IE in the S1AP INITIAL CONTEXT SETUP REQUEST message could be utilized or a new IE in this message. SPID may also be denoted RAT Frequency Selection Priority (RFSP) index or RFSP ID, where RAT stands for radio access technology, see for example the 3GPP standard documents TS 29.272, TS 23.401, TS 36.413 (S1AP) and TS 36.300.

Another way to facilitate for the scheduling network node 2 to determine whether pending uplink data is subject to conditional data transfer is to utilize reports about the contents of the transmission buffers of the wireless devices 3a, 3b, e.g. BSRs. Such reports may comprise information about the priority of the pending data in terms of the logical channel group of the channel on which the data is to be transmitted (wherein each channel group may be assigned a different priority level). That is, according to embodiments the indicator is associated with a level of priority for transmission of the delay tolerant data. Introducing a particular logical channel for conditional data transfer would thus allow the scheduling node to assign this particular logical channel to a logical channel group of its own. This in turn means that if the received buffer information indicates that the pending data pertains to this particular logical channel group, the scheduling node may conclude that the pending data is subject to conditional data transfer. That is, according to embodiments the level of priority is time dependent.

According to yet another embodiment the wireless device 3a is not arranged to indicate the need to be scheduled as long as only data subject to conditional data transfer is available for uplink transmission. Instead the wireless device 3a is, according to this embodiment, arranged to wait until the wireless device 3a also has other data to transmit. Hence, only then will the data subject to conditional data transfer be indicated in signalling of buffer content and only then will the wireless device 3a send a scheduling request to the network 1. According to this embodiment a regular transmission from the same wireless device 3a would be utilized as the "other" transmission to schedule the data for conditional data transfer with, while transmissions from other wireless device 3b may or may not be scheduled simultaneously.

Also for the uplink the concept of a maximum delay limit may be used, wherein a wireless device 3a with waiting uplink data for conditional transfer is scheduled for uplink transmission when the delay limit is reached, even if there is no other uplink transmission to be scheduled simultaneously. Similarly, if the maximum delay limit is reached (or is about to be reached) in the above described embodiment where the wireless device 3a withholds data that is subject to conditional data transfer until the wireless device 3a has other uplink data to transmit, the wireless device 3a would send a scheduling request (or a buffer status report) and transmit the data subject to conditional data transfer (using the subsequently allocated uplink transmission resources), even if the wireless device 3a has no other uplink data to transmit simultaneously.

According to embodiments the network cache is integrated with the scheduling functionality. In such cases no request for conditional data transfer or other indication (such as a new QCI value) is needed for the downlink. Instead all delay tolerant cached downlink data could always be opportunistically awaiting an opportunity for conditional data transfer.

As an alternative to having the network cache choose low load periods for requesting transmission of cache content, a feedback based approach could be used. If the cache receives feedback relating to when downlink data forwarded to the scheduler/scheduling node is transmitted, the cache may feed the scheduler/scheduling network node 2 with more data for conditional data transfer as soon as the previous data has been transmitted. The cache could be arranged to perform such operations without consideration of the load in the cell. A consequence would be that data for conditional data transfer may be stored for a longer time in the scheduler/scheduling network node 2, which means that to a certain extent the scheduler/scheduling network node 2 would handle part of the cache functionality (e.g. an additional auxiliary "mini-cache"). That is, according to embodiments a network cache is in a step S12 provided with information relating to the transmission of the delay tolerant data.

According to embodiments the network cache receives information relating to the downlink queue length(s) in the scheduler/scheduling network node 2 and initiates transfer of (portions) of the cache content (for conditional data transfer) when the queue length(s) is/are below a certain threshold (or when it/they is/are zero). That is, according to embodiments a network cache is in a step S14 provided with information relating to a queue length associated with the scheduling of the delay tolerant data.

Certain embodiments consider only sleep mode and active mode of the transmission equipment in the network node 2. According to other embodiments the network node 2 is associated with a number of intermediate stages in between those to modes. These intermediate stages could be based on dynamic setting of the bias of the power amplifier in the network node 2. For instance, the network node 2 could be arranged to allow transfer of downlink cached delay tolerant data content when its cell is otherwise idle, but combined with energy saving through re-biasing of the power amplifier. It would also be possible for the network node 2 to postpone transfer of downlink delay tolerant data, even though other data would be transferred simultaneously, in favour of energy saving through power amplifier re-biasing.

Figure 6:
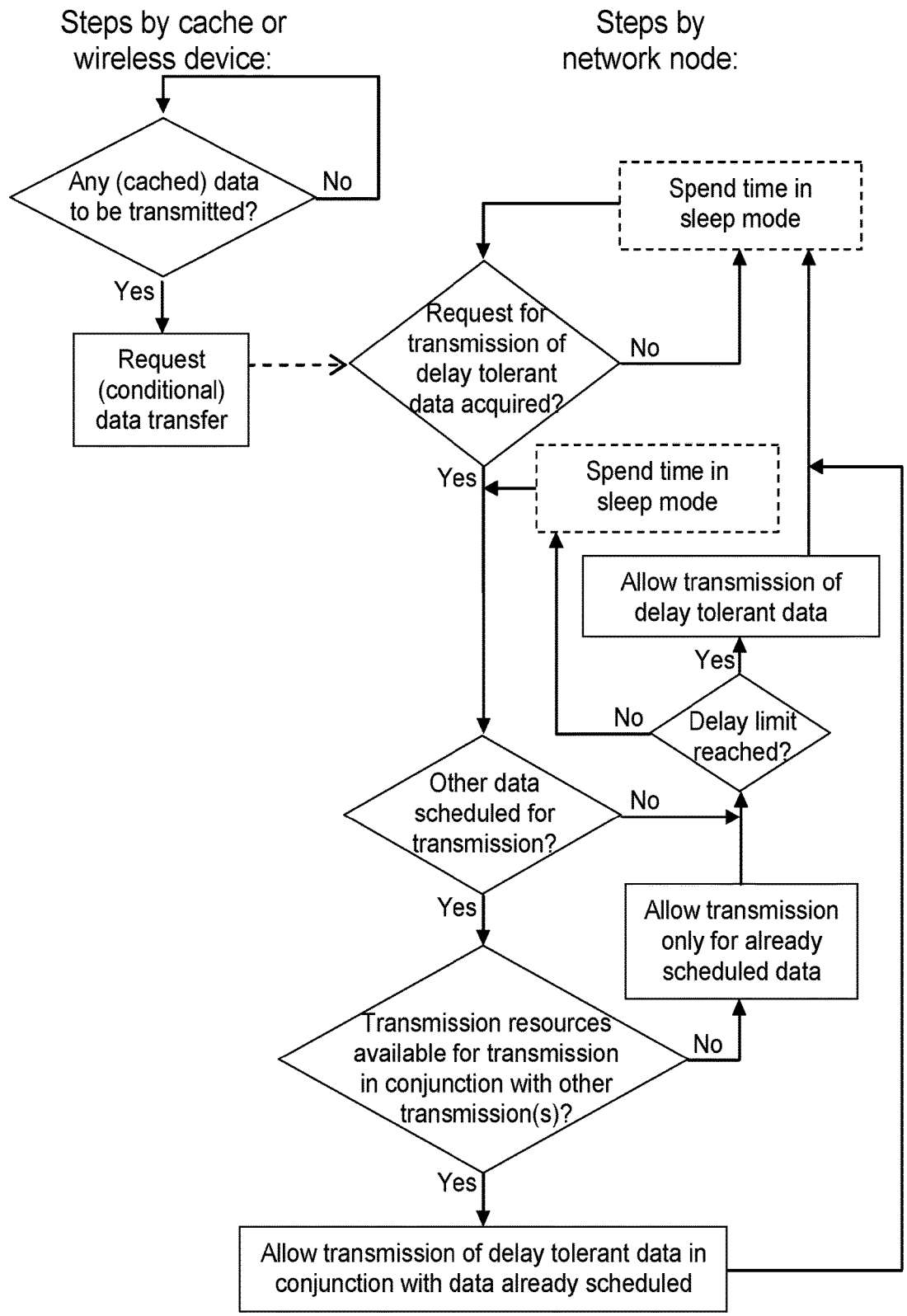

A procedure for conveying delay tolerant data using conditional data transfer according to one embodiment is schematically illustrated in FIG. 6. The flowchart of FIG. 6 is a schematic illustration of how conditional data transfer can be used for transmission of delay tolerant data where the delay tolerant data may either be located in a cache, such as a network cache, or in a wireless device 3a. The flowchart of FIG. 6 is a simplified schematic illustration. For instance, the indicated steps do not have to occur strictly sequentially, but may to some extent be performed in parallel. Scheduling and/or transmission of data may for instance occur in parallel with reception of, or checking for, received data for conditional data transfer. Another simplification is that the flowchart implies that all delay tolerant data for conditional transfer has to be transmitted simultaneously, whereas the delay tolerant data may actually optionally be divided into parts that are delivered using multiple transmissions. Only the scheduling aspects relevant to conditional data transfer are illustrated in the flowchart, while most of the scheduler's regular operation is omitted. At the cache or wireless device 3a a request for conditional data transfer of delay tolerant data is transmitted to the network node 2. The network node 2 thus acquires a request for transmission of the delay tolerant data as in step S2. Until such a request has been acquired the network node may spend time in a sleep mode. It is checked whether or not other data has already been scheduled for transmission. If so, it is checked whether or not there are any available non-utilized transmission resources simultaneously with the already scheduled data. If so, the delay tolerant data is scheduled for transmission as in step S4. Thereafter the network node 2 may enter a sleep mode. If other data has not been scheduled for transmission it is checked whether or not a delay time limit has been reached. If so, the delay tolerant data is re-scheduled for transmission as in step S10. If not so the network node 2 may enter a sleep mode. If there are not any available non-utilized transmission resources simultaneously with the already scheduled data, transmission is allowed only for the already scheduled data transmission.

The invention has mainly been described above with reference to a few embodiments. However, as is readily appreciated by a person skilled in the art, other embodiments than the ones disclosed above are equally possible within the scope of the invention, as defined by the appended patent claims. For example, certain embodiments have been related to LTE terms or 3G terms to exemplify certain features. In general the enclosed embodiments are applicable to any cellular system, in particular the 3GPP family of systems, including EPS/LTE and 3G/UMTS/WCDMA/HSPA. In LTE the eNB is responsible for the scheduling of transmissions across the radio interface and in 3G/UMTS/WCDMA the Node B is responsible for scheduling of HSPA transmissions across the radio interface, while the RNC is responsible for scheduling of regular (non-HSPA) WCDMA transmissions.

The invention claimed is:

1. A method for scheduling in a mobile communications system, the method being performed in a network node of the mobile communications system, comprising:
   acquiring, from a first user equipment, a scheduling request relating to conditional data transfer of delay tolerant data; and
   scheduling, by the network node, the delay tolerant data for transmission in an uplink transmission such that the delay tolerant data is to be transmitted in conjunction with data scheduled for uplink transmission by a second user equipment and utilizing available uplink transmission resources non-utilized for transmission of the data scheduled for uplink transmission by the second user equipment, wherein the delay tolerant data is associated with an indicator indicating that the delay tolerant data is delay tolerant, the indicator provided by at least one of a user equipment category, user equipment capabilities, user equipment subscription data, or information relating to uplink transmission buffers in the user equipment.

2. The method according to claim 1, wherein the delay tolerant data is associated with at least one delay time limit.

3. The method according to claim 2, wherein the at least one delay time limit is associated with a latest delivery time or a maximum delay for transmission of the delay tolerant data.

4. The method according to claim 2, wherein the delay tolerant data is scheduled for transmission utilizing said available transmission resources up until said at least one delay time limit has been reached.

5. The method according to claim 2, further comprising, upon reaching a priority delay time limit of said at least one delay time limit:
   increasing a scheduling priority for transmission of the delay tolerant data.

6. The method according to claim 5, wherein said priority delay time limit is shorter than said scheduling delay time limit.

7. The method according to claim 2, further comprising, upon reaching a scheduling delay time limit of said at least one delay time limit:
   allocating new transmission resources; and
   re-scheduling the delay tolerant data for transmission utilizing said new transmission resources.

8. The method according to claim 7, wherein the delay tolerant data is re-scheduled for transmission on next available transmission resources.

9. The method according to claim 1, wherein the indicator is provided as a quality of service class indicator, QCI, value.

10. The method according to claim 9, wherein the QCI value is between 10 and 255.

11. The method according to claim 1, wherein the indicator is provided as a node internal request signal.

12. The method according to claim 1, wherein the indicator is associated with a level of priority for transmission of the delay tolerant data.

13. The method according to claim 12, wherein the level of priority is time dependent.

14. The method according to claim 1, further comprising:
   providing a network cache with information relating to the transmission of the delay tolerant data.

15. The method according to claim 1, further comprising: providing a network cache with information relating to a queue length associated with the scheduling of the delay tolerant data.

16. The method according to claim 1, wherein the network node is associated with a plurality of activity levels, and wherein scheduling of the delay tolerant data further is dependent on a current activity level of the plurality of activity levels.

17. The method according to claim 1, wherein said delay tolerant data represents downlink data cached in the network node.

18. The method according to claim 1, wherein said mobile communications system is compliant with 3rd Generation Partnership Project Long Term Evolution, LTE, wherein said available transmission resources are associated with LTE resource blocks, and wherein the delay tolerant data is scheduled for transmission utilizing available but unused LTE resource blocks.

19. The method according to claim 1, wherein said mobile communications system is compliant with wideband code division multiple access, WCDMA, wherein said available transmission resources are associated with a code tree, and wherein the delay tolerant data is scheduled for transmission utilizing unused parts of said code tree.

20. The method according to claim 19, wherein the delay tolerant data is scheduled for transmission utilizing said unused parts of said code tree when being below an available transmission power limit.

21. The method according to claim 19, wherein the delay tolerant data is scheduled for transmission utilizing said unused parts of said code tree when interference associated with transmission of said delay tolerant data utilizing said unused parts of said code tree is below a predetermined threshold.

22. A network node for scheduling in a mobile communications system, comprising:
  a receiver;
  a transmitter; and
  one or more processors coupled to the receiver and the transmitter, the one or more processors configured to:
    acquire, from a first user equipment, a scheduling request relating to conditional data transfer of delay tolerant data; and
    schedule, by the network node, the delay tolerant data for transmission in an uplink transmission such that the delay tolerant data is to be transmitted in conjunction with data scheduled for uplink transmission by a second user equipment and utilizing available uplink transmission resources non-utilized for transmission of the data scheduled for uplink transmission by the second user equipment, wherein the delay tolerant data is associated with an indicator indicating that the delay tolerant data is delay tolerant, the indicator provided by at least one of a user equipment category, user equipment capabilities, user equipment subscription data, or information relating to uplink transmission buffers in the user equipment.

23. A non-transitory computer-readable storage medium storing a computer program for scheduling in a mobile communications system, the computer program comprising computer program code which, when executed by one or more processors of a network node of the mobile communications system, causes the network node to:
  acquire, from a first user equipment, a scheduling request relating to conditional data transfer of delay tolerant data; and
  schedule, by the network node, the delay tolerant data for transmission in an uplink transmission such that the delay tolerant data is to be transmitted in conjunction with data scheduled for uplink transmission by a second user equipment and utilizing available uplink transmission resources non-utilized for transmission of the data scheduled for uplink transmission by the second user equipment, wherein the delay tolerant data is associated with an indicator indicating that the delay tolerant data is delay tolerant, the indicator provided by at least one of a user equipment category, user equipment capabilities, user equipment subscription data, or information relating to uplink transmission buffers in the user equipment.

\* \* \* \* \*